Nov. 4, 1969  D. J. RABY  3,476,075
INSTRUMENT WITH COLORED POINTER SPEED INDICATOR
Filed June 1, 1967
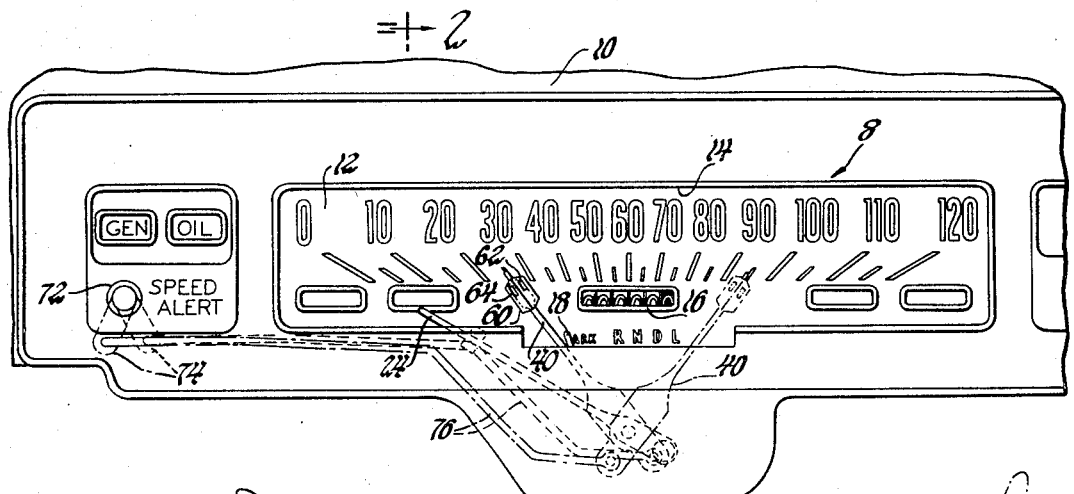
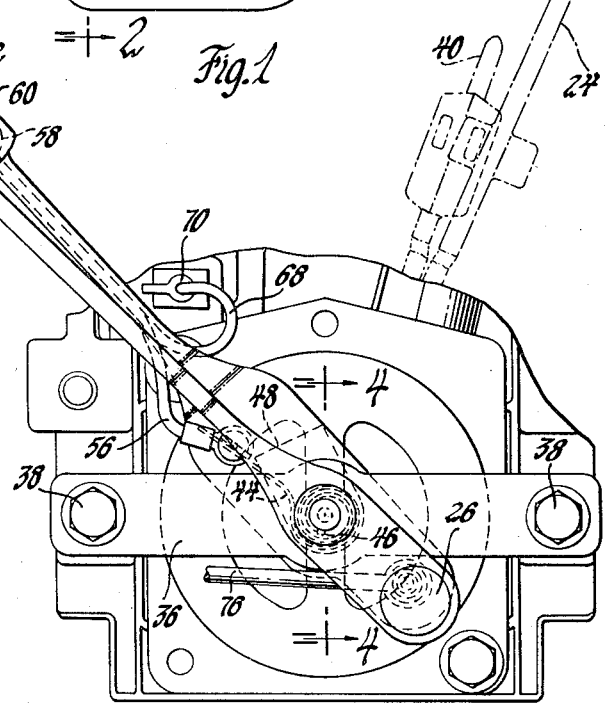
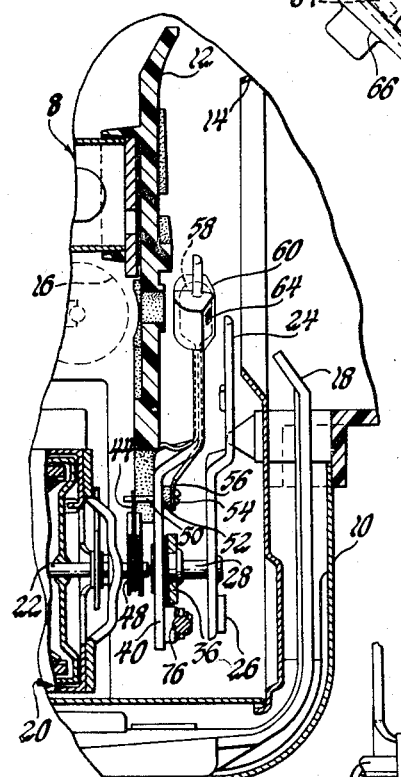
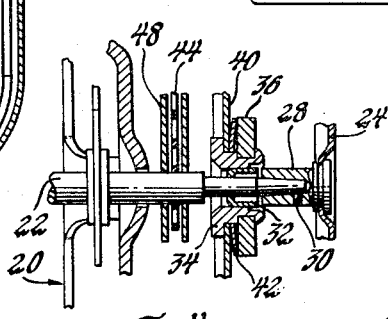
INVENTOR.
Dallas J. Raby
BY
George E. Johnson
ATTORNEY

United States Patent Office 3,476,075
Patented Nov. 4, 1969

3,476,075
INSTRUMENT WITH COLORED POINTER SPEED INDICATOR
Dallas J. Raby, Davison, Mich., assignor to General Motors Corporation, Detroit, Mich., a corporation of Delaware
Filed June 1, 1967, Ser. No. 642,888
Int. Cl. G01p 1/06
U.S. Cl. 116—116                4 Claims

ABSTRACT OF THE DISCLOSURE

A pointer instrument such as a speedometer with different vivid color areas for being separately exposed to indicate change in speed immediately over and/or under an adjustable setting of the instrument.

---

This invention relates to measuring instruments and more particularly to a pointer type instrument such as a speedometer and which is capable of giving clearly different and visible indications when an adjustable setting of the instrument reading obtains and is departed from.

A warning instrument in this field is disclosed in the United States Patent 2,165,498, granted July 11, 1939 and entitled "Illuminated Speedometer." The patented device is a speedometer capable of showing one vivid color at a preselected speed, another vivid color at another preselected speed and both vivid colors simultaneously at an intermediate speed. It is not capable of being adjusted so that those speeds may be changed at the option of the operator. It is also to be noted that the speed indication consists of a display of different colors in such a way that is difficult to distinguish a change in color at the desired set speed.

One object of the present invention is to provide an indication instrument which will cause a vivid color view to change with strong contrast when a condition measured by the instrument is attained, exceeded or diminished and to do so within a restricted range which may be varied at the option of the operator.

A feature of the present invention is an instrument having a dial with two pointers one of which is a main pointer and indicates a condition obtaining such as vehicle speed and the other bearing two vivid color areas either or both of which may be shielded by the main pointer within an optionally selected range of the instrument reading. Another feature is a 2-pointer and scale instrument in which illuminated and different vivid color areas borne by one of the pointers is shielded by the other or main pointer at a predetermined instrument reading and an approach or withdrawal of the main pointer from that reading will be promptly and clearly apparent by the uncovering of one or the other of the different vivid color areas without the necessity for discriminating between the colors within a restricted range of the instrument reading.

Other objects and features of the invention will become apparent as the description proceeds.

In the drawings:

FIGURE 1 is an elevation view of a portion of an automobile instrument panel in which a preferred embodiment of the present invention has been installed and showing one position of a main pointer and two possible positions of an adjustable pointer;

FIGURE 2 is an enlarged sectional view looking in the direction of the arrows 2—2 in FIGURE 1;

FIGURE 3 is a further enlarged view of details some of which are shown in FIGURE 1; and FIGURE 4 is a sectional view looking in the direction of the arrows 4—4 in FIGURE 3.

A conventional pointer speedometer in an unique combination with a vertical indicator pointer arrangement is disclosed in the United States Patent 3,180,309, granted Apr. 27, 1965 in the name of B. H. Clason. A similar magnetic cup driven speedometer is disclosed in the present case but with a different type of indicator as to the attainment of a preselected speed. A speedometer 8 is shown mounted on an automobile dash 10. A dial 12 is visible through a window 14 which also discloses an odometer 16 through the dial. A transmission shift needle 18 is located in the dash 10. The speedometer 8 has a conventional magnetic cup arrangement 20 for driving a speedometer shaft 22 and a main pointer 24 which is counterbalanced at 26. A hub 28 of the main pointer 24 is pinned as at 30 to the shaft 22.

A bearing cup 32 surrounds a reduced portion of the shaft 22 and is retained within a hub 34 in turn journaled in a crosspiece 36 fixed in position by two bolts 38. The hub 34 is fixed to a second pointer 40 and both are frictionally held against rotation by a spring washer 42 interposed between the second pointer 40 and the crosspiece 36.

One end of a hairspring 44 is fixed at 46 to the shaft 22 and the other end is, at times, adapted to bear against a member 48 of U-shaped cross-section fixed to the shaft. A pin 50 is attached to but insulated from the second pointer 40 by an insulator disc 52 and a screw 54. The pin 50 is so placed as to contact the hairspring 44. The U-shaped member 48 which is mounted on the shaft will push against the spring 44 and therefore move the spring out of contact with pin 50 to turn off bulbs 58 when the pointer 24 moves to indicate a speed less than the preset speed. The pin 50 and screw 54 serve as a terminal to which one end of an insulated wire 56 is connected. This wire leads to a light bulb 58 mounted in a housing 60 forming a part of the second pointer 40. A green lens 62 made of a transparent material and a red lens 64 made of the same transparent material as lens 62 are retained in the wall of the housing 60 and are so placed as to be shielded simultaneously by a shield or enlarged portion 66 of the main pointer 24 when the two pointers are in registry. A second wire 68 leads from the bulb 58 to a power supply point such as at 70.

A knob 72 protrudes from the panel 10 for manually adjusting the angular position of a crank 74 the free end of which is connected by a link 76 to the lower end of the second pointer 40.

In the operation of the speedometer, current will flow through the wire 68, the bulb 58, the wire 56, the pin 50 and then through the hairspring 44 to ground. The bulb 58 will therefore be illuminated when the main pointer 24 is moved by the internal operating mechanism of the speedometer to indicate a reading on the dial 12. This is accomplished by hairspring 44 contacting pin 50 just prior to the shield or enlarged portion 66 on pointer 24 reaching the red lens 64. This will illuminate both the red and the green lenses to indicate that you are approaching the desired preselected speed. Obviously, when the needle continues to move, it will block both the red and the green lenses and will indicate that you are at the preselected speed. If there is a further increase in speed beyond that preselected, once again then, both lenses will be uncovered. Upon a reduction in speed, the pointer 24 will move to a lower indication on the speedometer and the reverse of the above will occur.

Assuming that a speed of twenty-five miles per hour is desired, the second pointer 40 will be positioned as in FIGURE 1 with the use of the knob 72. When the vehicle attains that speed a distinct signal will be imparted in the peripheral vision of the car operator as both lenses will be shielded—i.e., no vivid light rays will be seen.

If the speed increases slightly, the red lens 64 will be uncovered and a clear red signal will show. A further increase will disclose both lenses and the operator knows for a certainty that he is traveling at a speed substantially higher than twenty-five miles per hour. If the vehicle speed reduces to slightly below twenty-five miles per hour, the green lens 62 will first be disclosed as a clear signal of the situation and a further decrease in speed will illuminate both lenses 62 and 64 until the shield 66 on the pointer 24 passes beyond the red lens, wherein hairspring 44 is moved out of engagement with pin 66 to turn off the bulb 58. All changes will be noted through the operator's peripheral vision processes.

I claim:

1. An indicating instrument having in combination two pointers, a main indicator pointer operable by the internal mechanism of said instrument and a second pointer adapted to serve as a means to indicate a change from a desired and predetermined instrument setting, said second pointer having two different color areas and being adjustable with respect to the indicating instrument and said first pointer, with said two different color areas being equidistant from the axis of said second pointer, said main indicating pointer having a shield of sufficient width to simultaneously cover said color areas when said pointers are in registry at the predetermined instrument setting to indicate the predetermined setting has been reached, wherein a change from the predetermined setting due to change in registry of the pointers will promptly and clearly show a different color.

2. An instrument as set forth in claim 1 wherein the two different color areas on said second pointer are transparent and are illuminated by means within said second pointer.

3. An instrument, such as a speedometer, comprising a graduated dial and two pointers coaxially and pivotally mounted to move across said dial, a first pointer being a main pointer operable by the internal mechanism of said instrument to give an actual instrument reading, the second pointer being independently adjustable with respect to said graduated dial and said first pointer to enable a selection and indication of a preselected reading of said instrument, two color areas on said second pointer located on the side away from said dial, and facing the plane of movement of said first pointer, with the said two colored areas on said second pointer being transparent and illuminated by means within said second pointer, said first pointer having a shield of sufficient width to simultaneously cover said two color areas when said pointers are in registry at a preselected reading to indicate the preselected reading has been reached wherein a change from the preselected reading due to change in registry of the pointers will clearly show a change in color.

4. An instrument as set forth in claim 3 wherein said two color areas are equidistant from the axis of said second pointer.

References Cited
UNITED STATES PATENTS

| | | | |
|---|---|---|---|
| 531,669 | 1/1895 | Weston | 116—129 |
| 2,075,530 | 3/1937 | Lohman | 340—263 |
| 2,289,120 | 7/1942 | House | 116—129 X |
| 2,728,072 | 12/1955 | Magid | 340—263 X |
| 2,984,204 | 5/1961 | White | 116—116 |
| 3,104,546 | 9/1963 | Hauptman | 116—116 X |
| 3,129,416 | 4/1964 | Freedman | 340—263 |

LOUIS R. PRINCE, Primary Examiner

D. M. YASICH, Assistant Examiner

U.S. Cl. X.R.

340—263